United States Patent [19]
Mezrich et al.

[11] 3,997,717
[45] Dec. 14, 1976

[54] ULTRASONIC WAVE RADIATION PATTERN DISPLAY SYSTEM INCORPORATING PHASE CONTRAST MEANS

[75] Inventors: Reuben Saul Mezrich, Rocky Hill; David Herman Raphael Vilkomerson, South Brunswick, both of N.J.

[73] Assignee: RCA Corporation, New York, N.Y.

[22] Filed: Feb. 2, 1976

[21] Appl. No.: 654,602

Related U.S. Application Data

[63] Continuation of Ser. No. 576,605, May 12, 1975, abandoned.

[52] U.S. Cl. .............................. 178/6.8; 73/67.5 H; 178/DIG. 18
[51] Int. Cl.² ...................... G01N 9/24; H04N 7/18
[58] Field of Search ............ 178/6.8, DIG. 18, 7.1; 73/555, 556, 67.5 H, 67.8 S; 340/5 H, 5 MP

[56] References Cited
UNITED STATES PATENTS 3,716,826   2/1973   Green .............................. 73/67.5 H

*Primary Examiner*—Howard W. Britton
*Attorney, Agent, or Firm*—Edward J. Norton; George J. Seligsohn

[57] ABSTRACT

The present system permits image of internal structure of ultrasonic wave scattering object to be visually revealed on a cathode ray tube display with good contrast and good resolution, even when acoustic attenuation characteristics of object are relatively uniform and scattering points in object are due substantially to differences in acoustic index of refraction. This is accomplished by employing an acoustic quarter-wave plate to relatively phase shift unscattered wave energy passed through object with respect to scattered wave energy passed through object, thereby transforming a phase pattern manifesting the object's internal structure into an intensity image pattern thereof which insonifies a flexible pellicle mirror. The remainder of the system converts this pattern into a visual display on the cathode ray tube.

8 Claims, 6 Drawing Figures

ULTRASONIC WAVE RADIATION PATTERN DISPLAY SYSTEM INCORPORATING PHASE CONTRAST MEANS

This is a continuation of application Ser. No. 576,605, filed May 12, 1975, Now abandoned.

This invention relates to an improvement in an ultrasonic wave radiation pattern display system of the type in which a pattern at the surface of a flexible pellicle mirror insonified by ultrasonic wave energy is displayed on a cathode ray tube. This improvement permits a visual image to be displayed of all types of insonified scattering objects, including those whose attenuation characteristics do not appreciably vary from point to point.

Reference is made to copending U.S. patent application Ser. No. 558,468, filed Mar. 14, 1975 by Mezrich et al, and assigned to the same assignee as the present application. U.S. patent application Ser. No. 558,468 discloses a system for visually displaying an ultrasonic radiation pattern at the surface of an insonified flexible pellicle mirror. Briefly, in this system, the flexible pellicle mirror together with a wiggled rigid reference mirror form an interferometer for providing two mutually coherent interfering light components. Detection of the peak phase change at the ultrasonic frequency of the radiation pattern in these two mutually coherent interfering light components, one of which is obtained by reflection from the wiggled rigid reference mirror and the other of which is obtained by reflection from a spot of the flexible pellicle mirror, provides an output proportional to the displacement amplitude of vibration of the spot of the pellicle. In order to achieve this result, the rigid reference mirror is wiggled through an excursion greater than one-half the wavelength of the coherent light at a frequency which is much lower than the frequency of the ultrasonic radiation insonifying the pellicle, and the displacement amplitude of the pellicle is very many times smaller than this light wavelength. By raster scanning the spot over the area of the pellicle in synchronism with the raster scanning of the electron beam of the cathode ray tube, and at the same time intensity modulating the electron beam of the cathode ray tube in accordance with the peak detected output, a two-dimensional visual display of the radiation pattern insonifying the pellicle is achieved.

The aforesaid U.S. patent application Ser. No. 558,468 considers three different typical forms the radiation pattern may take. In the simplest case, the radiation pattern is that of an ultrasonic transducer, whose radiation pattern is to be ascertained. In a somewhat more complex case, the transducer is a calibrated transducer, whose radiating characteristics are already known, but the radiation from the transducer is acted on by some acoustic element under test situated between the transducer and the insonified pellicle mirror, which acoustic element under test modifies the radiation pattern. In the most complex arrangement shown in the aforesaid U.S. patent application Ser. No. 558,468, suitably condensed ultrasonic wave energy is used to insonify a specimen under test, which has different ultrasonic wave energy attenuating characteristics at different points over its cross section. By employing suitable acoustic imaging optics, a real image of the spatial distribution of the ultrasonic wave energy transmitted through the specimen is projected as a radiation pattern on the insonified flexible pellicle mirror.

Some types of specimens do not have attenuation characteristics which vary appreciably from point to point over the cross section thereof. However, many such specimens still have a detailed structure due to variations in phase velocity characteristics, i.e. variations in their acoustic index of refraction. This detailed structure is defined by a spatial distribution of ultrasonic wave energy scattering points within the insonified specimen. The present invention employs scattering points, which may arise from point to point variations in phase velocity characteristics and/or attenuation characteristics to produce a projected real image radiation pattern of the specimens detailed structure on the flexible pellicle mirror. This radiation pattern reveals the detailed structure with both good resolution and good constrast. This good resolution and good contrast is achieved, in accordance with the principles of the present invention, even when the attenuation characteristics of the specimen are substantially uniform over its entire cross section.

In particular, the present invention provides means for deriving an interference pattern between the portion of the ultrasonic wave energy incident on an object which has been scattered in passing therethrough by scattering points therein and the remaining portion of ultrasonic wave energy passing through the object which has not encountered any scattering points and, therefore, has not been scattered. In order to accomplish this, the present invention takes advantage of the known fact that the phase of scattered ultrasonic wave energy passing through a scattering object is relatively phase shifted, with respect to the phase of unscattered ultrasonic wave energy passing through the object, by an amount which incudes a $\pm 90°$ component. This $\pm 90°$ component predominates for most actual scattering objects, due to the spatial distribution and size of regions of differing acoustic index of refraction therein. Thus, the scattered and unscattered ultrasonic wave energy emerging from the objects are substantially in phase quadrature with respect to each other. Two components of wave energy in phase quadrature do not interfere with each other. However, two commponents of wave energy which vary between an in-phase condition and a 180° out-of-phase condition do interfere with each other. Therefore, in accordance with principles of the present invention, phase shift means are situated intermediate the object and the flexible pellicle mirror for phase shifting the beam of unscattered ultrasonic wave energy by substantially an odd multiple of 90° relative to the scattered ultrasonic wave energy. Thus, depending upon whether the original 90° phase shift between the unscattered ultrasonic wave energy and the scattered ultrasonic wave energy is positive or negative, the algebraically added 90° phase shift results in the relative phases of the unscattered ultrasonic wave energy and the scattered ultrasonic wave energy between 0° and 180°, the required condition for the occurrence of interference therebetween. This results in an acoustic interference pattern being formed on the insonified flexible mirror.

This and other features and advantages of the following invention will become more apparent from the following detailed description taken together with the accompanying drawing, in which:

FIG. 1 is a block diagram of the system for the visual display of ultrasonic radiation pattern which corresponds to FIG. 1 of the aforesaid U.S. patent application, Ser. No. 558,468;

FIG. 2, which corresponds with FIG. 3c of the aforesaid U.S. patent application, Ser. No. 558,468, shows an example of the acoustic wave derivation and propagation means of FIG. 1 for insonifying the flexible pellicle mirror with a projected real image of an object;

Figure 1:
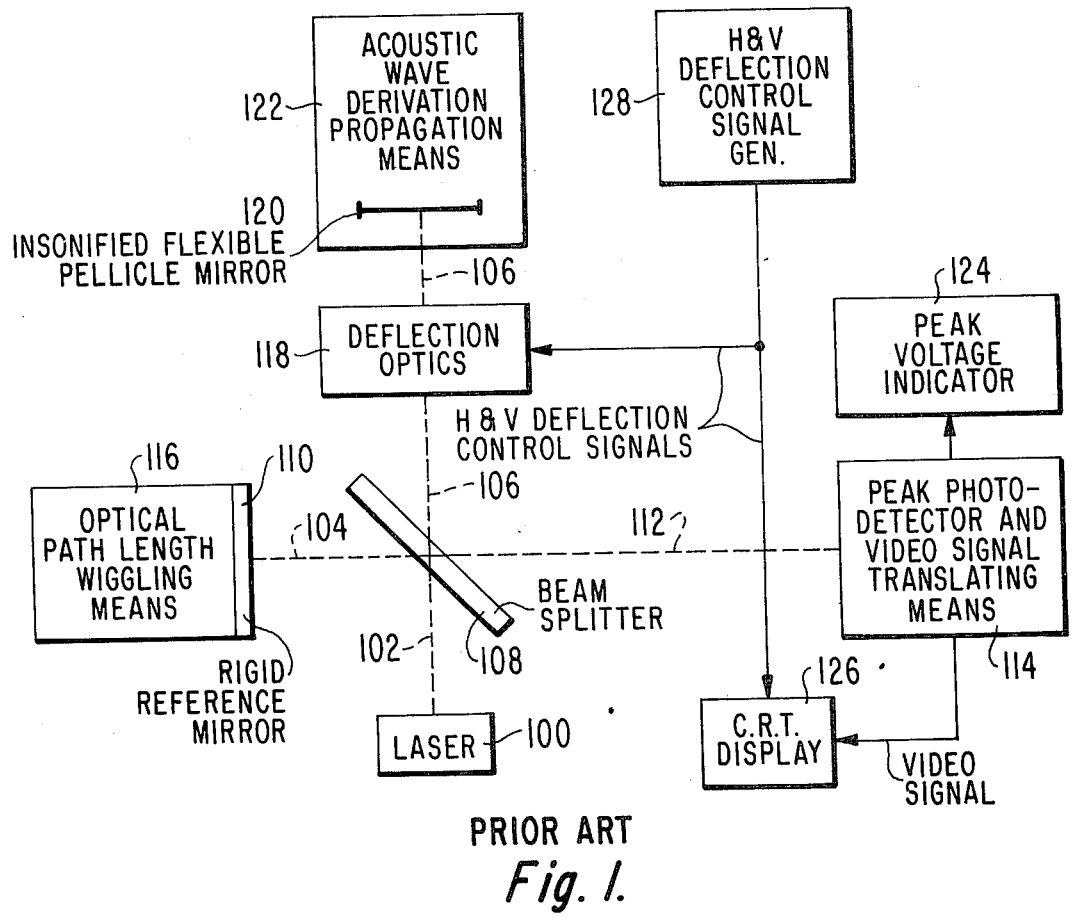

The system shown in FIG. 1, which forms the subject matter of the aforesaid U.S. patent application Ser. No. 558,468, comprises laser 100 which emits coherent monochromatic light beam 102, at a predetermined wavelength. Light beam 102 is split into mutually coherent first light component 104 and second light component 106 by beam splitter 108.

First light component 104 is reflected from rigid reference mirror 110 and returned to beam splitter 108. A portion of reflected first light component 104 passes through beam splitter 108 and travels over path 112 to the light sensing element of peak photodetector and video signal translating means 114.

The optical path length (the path length measured in wavelengths to the laser light) traveled by first light component 104 in making a round trip between beam splitter 108 and rigid reference mirror 110 is continuously varied at a predetermined frequency much lower than the ultrasonic wave frequency, by an amount which is more than one-half the wavelength of the laser light beam employed. Optical path length wiggling means 116, which may be a piezoelectric vibrator or an electro-optic crystal modulator, provides the continuous variation in the optical path length between beam splitter 108 and rigid reference mirror 110. So long as the peak-to-peak amplitude vibration of either rigid reference mirror 110 itself or the optical path length in wavelengths between beam splitter 108 and rigid reference mirror 110 is more than one-quarter of a wavelength of the laser light, the variation in the round trip optical path length between beam splitter 108 and rigid reference mirror 110 exceeds the required one-half wavelength of the laser light.

Second light component 106, after passing through deflection optics 118, is reflected from a spot of isonified flexible pellicle mirror 120 and returned through deflection optics 118 to beam splitter 108. Deflection optics 118, in response to horizontal and vertical deflection control signals applied thereto from horizontal and vertical deflection control signal generator 128, may be employed to raster scan the reflected spot from insonified flexible pellicle mirror 120 over the area thereof. These horizontal and vertical deflection control signals may also be employed to raster scan electron beam of cathode ray tube display 126 in synchronism with the scanning of the surface of flexible pellicle mirror 120 by second light component 106.

In any case, the total laser light directed along path 112 and incident on the light sensing element of peak photodetector and video signal translating means 114 is composed of a portion of first light component 104 reflected from wiggled rigid reference mirror 110 and a portion of second light component 106 reflected from insonified flexible pellicle mirror 120. These two light components, traveling together over path 112 and incident on the light sensing element of peak photodetector and video signal translating means 114, interfere with each other. Therefore, as is known in interferometry, the instantaneous amplitude of light sensed by the sensing element of block 114 at any instant of time depends on the phase difference between these two incident light components at that instant of time.

As more fully described in the aforesaid U.S. patent application Ser. No. 558,468, peak photodetector and video signal translating means 114 produces a video signal output which is continuously substantially proportional to the peak phase change occurring at the frequency of the ultrasonic wave energy insonifying the flexible pellicle mirror as the flexible pellicle mirror is raster scanned by second light component 106. This video signal output from peak photodetector and video signal translating means 114 is employed to intensity modulate the electron beam of cathode ray tube display 126.

In this manner, cathode ray tube display 126 visually displays a pattern which corresponds to the ultrasonic wave energy radiation pattern with which flexible pellicle mirror 120 is then being insonified.

Figure 2:
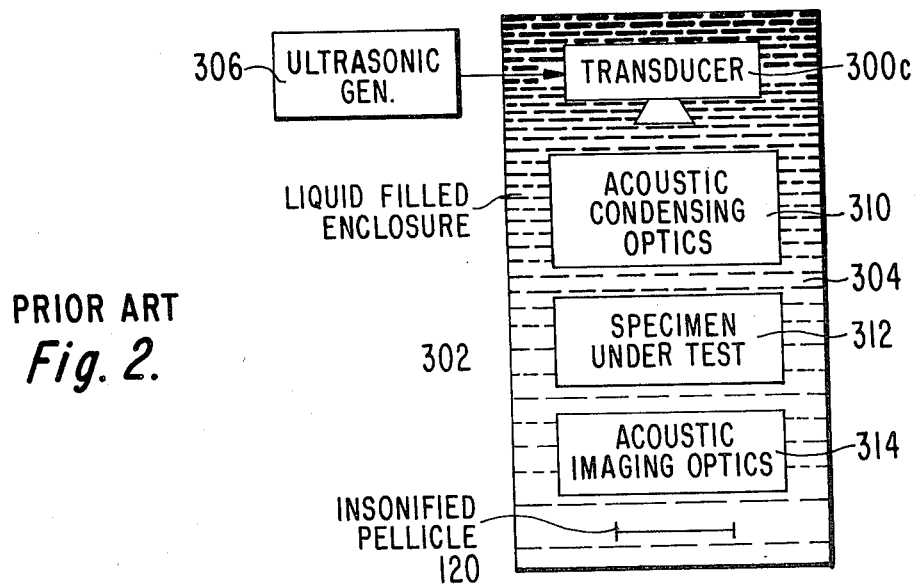

One form acoustic wave derivation and propagation means 122 may take is shown in FIG. 2 (which corresponds with FIG. 3c of the aforesaid U.S. patent application Ser. No. 558,468). Specifically, a transducer 300c is placed in enclosure 302. Enclosure 302 is filled with an ultrasonic wave propagating fluid 304, which is normally a liquid such as water. Transducer 300c is energized by wave energy at a suitable ultrasonic frequency between 0.5–10 MHz from ultrasonic generator 306. Also immersed in propagating fluid 304 is insonified flexible pellicle mirror 120 of the interferometer of FIG. 1. The ultrasonic wave energy emitted by transducer 300c, after being condensed by acoustic condensing optics 310, is used to insonify an object, such as specimen under test 312, which may be a tissue sample obtained by biopsy. In general, specimen under test 312 usually has different ultrasonic wave energy attenuating characteristics at different points over its cross section. Therefore, the spatial distribution of the ultrasonic wave energy transmitted through specimen under test 312 contitutes an ultrasonic wave pattern which reveals structural detail of the insonified specimen under test 312. Acoustic imaging optics 314 projects a real image of this pattern on insonified flexible pellicle mirror 120 as a spatial distribution of peak amplitudes of ultrasonic vibration over the surface area of insonified flexible pellicle mirror 120. It is this ultrasonic wave real image of this pattern on the surface area of insonified pellicle 120 which constitutes the radiation pattern that is visually manifested on cathode ray tube display 126 of FIG. 1.

While most types of objects which may form the specimen under test 312 do, in fact, exhibit different ultrasonic wave energy attenuating characteristics at different points over their cross sections, some objects which may form the specimen under test 312 do not exhibit any appreciable difference in such attenuating characteristics.

However, internal structural details of an insonified object also may be revealed by differences in the acoustic index of refraction (relative phase velocity) from point to point over the cross section of specimen under test 312, rather than or in additon to differences in attenuating characteristics. Such differences from point to point over the cross section of the specimen under test give rise to scattering points, regardless of whether these differences are due to variations in the index of refraction, differences in the attenuating characteristics, or both.

While the present invention operates with any type of ultrasonic wave scattering object, regardless of whether scattering is caused by variation from point to point in the acoustic index of refraction or in the attenuating characteristic or both, it is particularly suitable for use in the case where scattering is due primarily to differences in the acoustic index of refraction, rather than differences in the attenuating characteristic. The reason for this is that the present invention makes it possible to reveal with good resolution and good contrast the detailed internal structure of ultrasonic wave scattering objects having relatively uniform attenuating characteristics, but having variations from point to point in acoustic index of refraction. Without the use of the present invention, at best, only an outline of the detailed structure of such scattering objects would be revealed.

Figure 3:
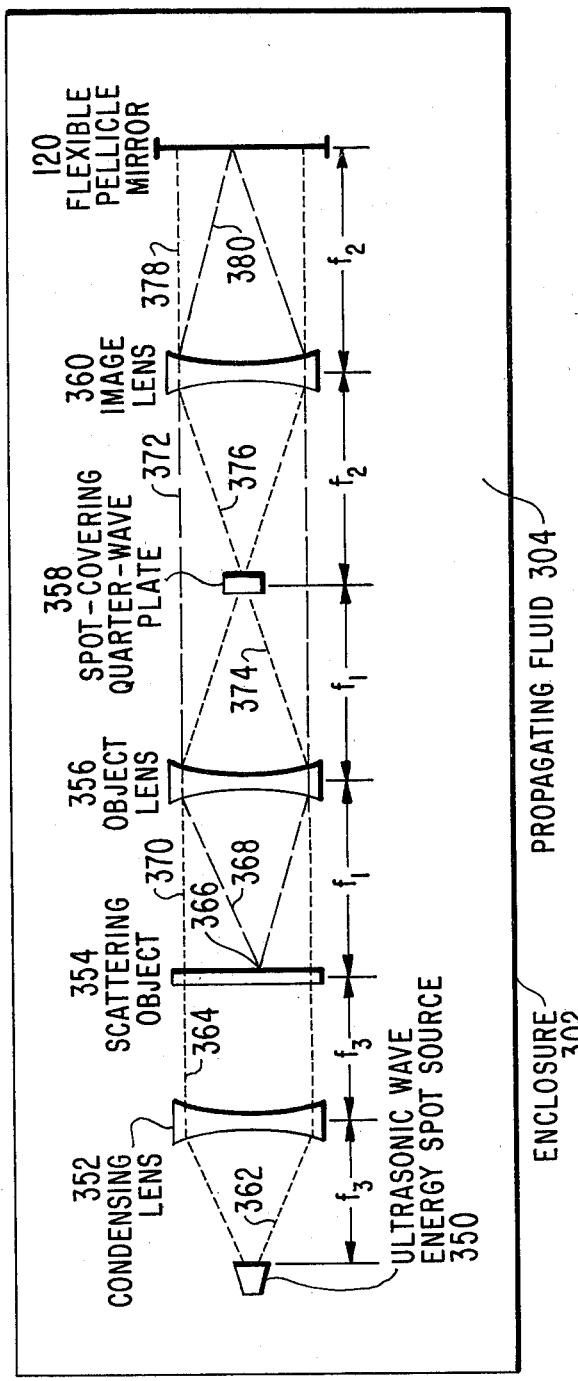
FIG. 3 is a block diagram of a first embodiment of the present invention.

Referring now to FIG. 3, there is shown a a first embodiment of the present invention. Immersed in propagating fluid 304, within enclosure 302, are ultrasonic wave energy source 350, condensing lens 352, scattering object 354, object lens 356, quarter-waveplate 358, image lens 360 and flexible pellicle mirror 120, oriented with respect to each other as shown in FIG. 3. In particular, each of lenses 352, 356 and 360 are composed of a plastic which is capable of propagating acoustic waves at a higher velocity than the propagating fluid 304, (which may be water) within enclosure 302. Therefore, unlike the situation which normally exists for light lenses, the index of refraction of an acoustic lens is less than that of the surrounding propagating medium. For this reason, all of acoustic lenses 352, 356, and 358 are concave, rather than convex.

As shown in FIG. 3, object lens 356 has a focal length $f_1$, image lens 360 has a focal length $f_2$ and condensing lens 352 has a focal length $f_3$. Ultrasonic wave energy source 350 located substantially on the optical axis of condensing lens 352, object lens 356 and image lens 360, and in the front focal plane of condensing lens 352, is a spot source which emits divergent beam 362 of ultrasonic wave energy (as indicated by short dashed lines). Divergent beam 362 is transformed into parallel beam 364 having a plane wavefront by condensing lens 352.

Parallel beam 364 is incident on scattering object 354 which includes one or more scattering points, such as scattering point 366. Each scattering point, such as scattering point 366, in response to incident ultrasonic wave energy 364, acts as a point source of wave energy which emits divergent beam 368 (as indicated by long dashed lines). The portion of incident ultrasonic wave energy 364 which remains unscattered by scattering object 354 continues on as parallel beam 370 (as indicated by the short dashed lines). As is known from diffraction optics, the time phase of scattered wave energy 368 differs from the time phase of unscattered waver energy 370 by either +90° or −90°.

Scattering object 354, besides being located in the back focal plane of condensing lens 352, is also located in the front focal plane of object lens 356. Object lens 356, therefore, transforms the scattered wave energy in divergent beam 368 into parallel beam 372 (as indicated by the long dashed lines) and transforms the unscattered wave energy in parallel beam 370 into convergent beam 374 (as indicated by the short dashed lines).

Located in the common back focal plane of object lens 356 and front focal plane of image lens 360 is quarter-waveplate 358. As shown in FIG. 3, quarter-waveplate 358, whose cross sectional area is quite small relative to the aperture of the lens system, is substantially symmetrically disposed with respect to the optical axis of the system in the common focal plane of object lens 356 and image lens 360. Quarter-waveplate 358 is made up of a given thickness of a material, such as polyethylene, having a predetermined difference index of refraction with respect to the index of refraction of propagating fluid 304. The given thickness is such that any given wave energy incident on and passing through quarter-waverplate 358 is shifted in phase by an odd number of quarter wavelengths at the given frequency of the ultrasonic wave energy with respect to that wave energy which misses quarter-waveplate 358 and travels through the same given thickness of propagating fluid 304.

As shown, substantially all the unscattered wave energy in convergent beam 372 is focused on and passes through quarter-waveplate 358. However, only a relatively small amount of the scattered wave energy in parallel beam 372 impinges on and passes through quarter-waveplate 358, due to the relatively small cross section of quarter-waveplate 358 with respect to the aperture of the system. However, since the time phase of the scattered wave energy and the unscattered wave energy is originally ±90° with respect to each other, the additional 90° phase shift provided between the scattered and unscattered wave energy produced by quarter-waveplate 358 results in the unscattered wave energy emerging from quarter-waveplate 358 in divergent beam 376 (as indicated by the short dashed lines) being either in-phase with or 180° out-of-phase with most of the scattered wave energy in parallel beam 372, which missed passing through quarter-waveplate 358.

Both the scattered wave energy in parallel beam 372 and the unscattered wave energy in divergent beam 376 are incident on image lens 360. Since quarter-waveplate 358 is situated in the front focal plane of image lens 360, image lens 360 transforms the unscattered wave energy in divergent beam 376 into parallel beam 378 of unscattered wave energy (as indicated by the short dashed lines) and transforms the scattered wave energy in parallel beam 372 into convergent beam 380 of scattered wave energy (as indicated by the long dashed lines). Further, since flexible pellicle mirror 120 is located in the back focal plane of image lens 360, the scattered wave energy in convergent beam 380 is focused to a point on flexible pellicle mirror 120, whose location corresponds to the location of the originating scattering point 366 of scattering object 354. In this manner, flexible pellicle mirror 120 is insonified with scattered ultrasonic wave energy which is spatially distributed as a real image of the spatial distribution of the scattering points of scattering object 354. At the same time, the entire surface of flexible pellicle mirror 120 is insonified by the unscattered ultrasonic wave energy in parallel beam 378.

If it were not for the phase shift of an odd number of quarter-wavelengths provided by quarter-waveplate 358, it would not be possible to discriminate between the insonification of flexible pellicle mirror 120 by scattered ultrasonic wave energy, as opposed to insonification of flexible pellicle mirror 120 by unscattered ultrasonic wave energy. However, the fact that, due to the presence of quarter-waveplate 358, the scattered and unscattered ultrasonic wave energy simultaneously insonifying flexible pellicle mirror 120 varies between an in-phase condition and a 180° out-of-phase condition, means that the radiation pattern insonifying the surface of flexible pellicle mirror 120 forms an interference pattern over only those portions of the surface of flexible pellicle mirror 120 which are simultaneously receiving both scattered and unscattered ultrasonic wave energy. In this manner, the spatial distribution of the amplitude of vibration of flexible pellicle mirror 120 from point to point over its cross section manifests the image formed by the scattered wave energy.

Figure 4A:
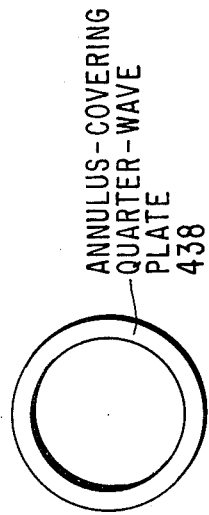
FIG. 4a shows the details of the spatial filter employed in the embodiment of FIG. 4
Figure 4B:
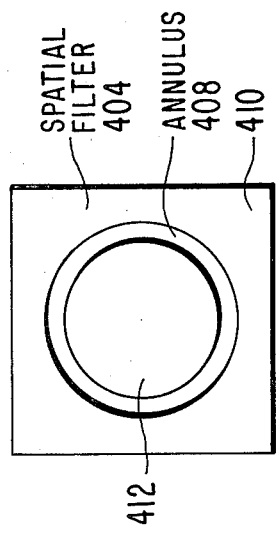
FIG. 4b shows details of the quarter-waveplate employed in the embodiment of FIG. 4.
Figure 4:
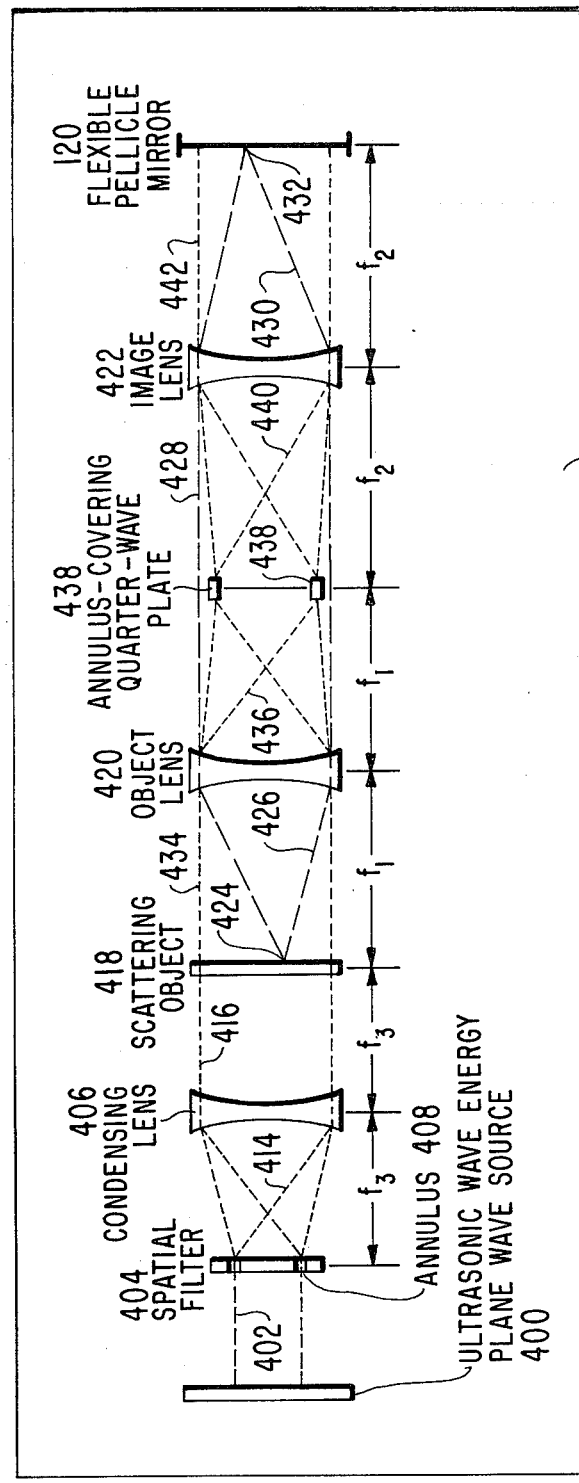
FIG. 4 is a block diagram of a second embodiment of the present invention.

Referring now to FIG. 4, there is shown a second embodiment of the present invention which is capable of providing somewhat better resolution and somewhat more efficient use of generated ultrasonic wave energy than the embodiment shown in FIG. 3.

Specifically, the arrangement of FIG. 4 employs an ultrasonic wave energy plane wave source 400, rather than a spot source as employed in FIG. 3. Preferably, ultrasonic wave energy plane wave source 400 comprises a relatively large area rigid plate, which vibrates as a piston at the given frequency of the ultrasonic wave. However, alternatively, ultrasonic wave energy plane wave source 400 may comprise an additional lens (not shown) and a spot source situated in the front focal plane of this additional lens, with the additional lens converting the divergent beam from the spot source into a plane wave front. In any case, parallel beam 402 of ultrasonic wave energy is emitted by source 400. Parallel beam 402 is incident on spatial filter 404, which is located in the front focal plane of condensing lens 406. As shown in detail in FIG. 4a, spatial filter 404 incorporates annulus 408 therein for passing incident ultrasonic wave energy therethrough. The remainder of spatial filter 404 prevents at least most of the ultrasonic wave energy incident thereon from passing therethrough. By way of example, spatial filter 404 may comprise two separate pieces 410 and 412 of a sound-absorbing material, such as butyl rubber, separated by annulus 408. The two pieces of sound-absorbing material, which are of sufficient thickness to absorb most of the incident ultrasonic wave energy incident thereon, may be secured to a thin sound-transmissive backing for support or may be interconnected by any other arrangement which defines an effective ultrasonic wave aperture in the form of annulus 408.

The annular-shaped ultrasonic wave energy emerging from spatial filter 404 forms beam 414 which is incident on condensing lens 406. Condensing lens 406 transforms beam 414 into parallel beam 418, which is incident on scattering object 418.

Condensing lens 406, scattering object 418, object lens 420, image lens 422 and flexible pellicle mirror 120 are arranged in all material respects to the corresponding elements (condensing lens 352, scattering object 354, object lens 356, image lens 360 and flexible pellicle mirror 120) of FIG. 3. Therefore, scattering object 418 scatters a portion of the ultrasonic wave energy incident thereon from scattering points thereof, such as scattering point 424, to form a divergent beam of scattered ultrasonic wave energy 426 (as indicated by long dashed lines). In the same manner as described in detail in connection with FIG. 3, the scattered ultrasonic wave energy in beam 426 is transformed into parallel beam 428 by object lens 420 and is then transformed into convergent beam 430 by image lens 422. Convergent beam 430 of scattered ultrasonic wave energy is focused at point 432 of flexible pellicle mirror 120. Just as point 432 on the surface of flexible pellicle mirror 120 corresponds with scattering point 424 of scattering object 418, each and every other scattering point in scatterng object 418 gives rise to a corresponding image point of the surface of flexible pellicle mirror 120.

However, in the case of FIG. 4, the parallel beam of unscattered wave energy 434 (indicated by short dashed lines) passing through scattering object 418 is focused by object lens 420 into beam 436, which forms a real image of annulus 408 in the common back focal plane of object lens 420 and front focal plane of image lens 422. Situated in coincidence with this real image of annulus 408 is annulus-covering quarter-waveplate 438, shown in detail in FIG. 4b. Quarter-waveplate 438 serves the purpose of phase shifting the unscattered ultrasonic wave energy by an odd number of quarter-wavelengths at the given frequency of the ultrasonic wave energy with respect to most of the scattered ultrasonic wave energy in the same manner described in detail in connection to FIG. 3.

The unscattered ultrasonic wave energy emerging from annulus-covering quarter-waveplate 438 as divergent beam 440, is transformed into parallel beam 442 by image lens 422. The unscattered ultrasonic wave energy in beam 442 incident on the surface of flexible pellicle mirror 120 interferes with the imaged scattered ultrasonic wave energy on the surface of flexible pellicle mirror 120, in the manner described in detail in connection with FIG. 3, since the relative phase of the unscattered wave energy and the scattered wave energy is either in-phase or 180° out-of-phase with respect to each other.

The advantage of the arrangement shown in FIG. 4 with respect to that shown in FIG. 3, is that a greater proportion of the ultrasonic wave energy emitted from the energy source may be confined within the aperture of the system in FIG. 4 than is the case of FIG. 3. Furthermore, the overall cross sectional area of the annulus-covering quarter-waveplate employed in FIG. 4 may be made substantially larger than the relatively small cross sectional area of quarter-waveplate 358 employed in FIG. 3. This permits a higher resolution capability in the imaged radiation pattern on flexible pellicle mirror 120 to be achieved in the arrangement of FIG. 4 than can be achieved with the arrangement of FIG. 3.

What is claimed is:

1. In an ultrasonic wave radiation pattern display system in which the radiation pattern manifested by a flexible pellicle mirror insonified by ultrasonic wave energy of a first given frequency is displayed on a cathode ray tube; said system including a detection means responsive to the illumination thereof with first and second components of coherent light of predetermined wavelength λ for intensity modulating the electron beam of said cathode ray tube with an output signal substantially proportional to a peak phase change at said first given frequency in said interfering first and second light components, an interferometer comprising a rigid reference mirror for reflecting said first light component and said flexible pellicle mirror for reflecting said second light component from a spot thereof, wherein the round-trip optical path length of said first light component reflected from said rigid reference mirror is wiggled at a second given frequency by an amount which is greater than λ/2, said second given frequency being significantly lower than said first given frequency, and wherein said second light component reflected from said spot of said flexible pellicle mirror and the electron beam of said cathode ray tube are respectively scanned over the surface of said flexible pellicle mirror and the screen of said cathode ray tube in synchronism with each other to thereby display said radiation pattern; the improvement comprising:

a. first means including an ultrasonic wave propagating fluid in which is immersed said flexible pellicle mirror and an ultrasonic wave scattering object in spaced relationship with respect to said flexible pellicle mirror, b. second means for insonifying said object with ultrasonic wave energy having a predetermined wavefront to derive a beam of unscattered ultrasonic wave energy having said predetermined wavefront and scattered ultrasonic wave energy emanating from scattering points of said object, and c. phase shift means situated intermediate said object and said flexible pellicle mirror for phase shifting said beam of unscattered ultrasonic wave energy by substantially an odd multiple of 90° relative to said scattered ultrasonic wave energy, d. whereby said radiation pattern manifested by said insonified flexible mirror comprises an ultrasonic wave intensity pattern formed by algebraic addition of said phase shifted unscattered and said scattered ultrasonic wave energy then insonifying said flexible pellicle mirror.

2. The system defined in claim 1, wherein said phase shift means includes acoustic lens means situated between said object and said flexible pellicle mirror in the path of both said beam of unscattered ultrasonic wave energy and said scattered ultrasonic wave energy for imaging solely said beam of unscattered wave energy at a given plane intermediate said object and said flexible pellicle mirror and for imaging solely said scattered ultrasonic wave energy at said flexible pellicle mirror, and an acoustic quarter-wave plate at said first given frequency disposed in substantial coincidence with said image of said beam of unscattered ultrasonic wave energy in said given plane.

3. The system defined in claim 2, wherein said acoustic lens means includes an object lens having a first focal length with said object being situated substantially in the front focal plane of said object lens and said given plane substantially coinciding with the back focal plane of said object lens and an image lens having a second focal length with said given plane substantially coinciding with the front focal plane of said image lens and said flexible pellicle mirror being situated substantially in the back focal plane of said image lens, and wherein said predetermined wavefront is substantially a plane wavefront.

4. The system defined in claim 3, wherein said second means comprises a condensing lens immersed in said fluid, said condensing lens having a third focal length and being located with said object substantially in the back focal plane of said condensing lens, and a spot source of said ultrasonic wave energy of said first given frequency immersed in said fluid and located substantially in the front focal plane of said condensing lens, whereby the image of said beam of unscattered ultrasonic wave energy in said given plane is a spot.

5. The system defined in claim 4, wherein the cross section of said quarter-wave plate is substantially the size of said spot image in said given plane.

6. The system defined in claim 3, wherein said second means comprises a condensing lens immersed in said fluid, said condensing lens having a third focal length and being located with said object substantially in the back focal plane of said condensing lens, an acoustic spatial filter having an annulus therein providing a spatial passband through said annulus for ultrasonic wave energy incident thereon, said spatial filter being located substantially in the front focal plane of said condensing lens, and means for insonifying said spatial filter with a plane wavefront of ultrasonic wave energy of said first given frequency incident thereon, whereby the image of said beam of unscattered ultrasonic wave energy in said given plane is an annulus.

7. The system defined in claim 6, wherein the cross section of said quarter-wave plate is an annulus of substantially the same shape and size as said annulus image in said given plane.

8. In combination:

a. first means including an ultrasonic wave propagating fluid in which is immersed a flexible pellicle and an ultrasonic wave scattering object in spaced relationship with respect to said flexible pellicle, b. second means for insonifying said object with ultrasonic wave energy having a predetermined wavefront to derive a beam of unscattered ultrasonic wave energy having said predetermined wavefront and scattered ultrasonic wave energy emanating from scattering points of said object, c. phase shift means situated intermediate said object and said flexible pellicle for phase shifting said beam of unscattered ultrasonic wave energy by substantially an odd multiple of 90° relative to said scattered ultrasonic wave energy, d. whereby said insonified flexible pellicle manifests a radiation pattern which comprises an ultrasonic wave intensity pattern formed by algebraic addition of said phase shifted unscattered and said scattered ultrasonic wave energy then insonifying said flexible pellicle, and e. display means coupled to said insonified flexible pellicle and responsive to said radiation pattern manifested thereby for visually displaying an image of said radiation pattern insonifying said flexible pellicle on an imaging surface of a display device of said display means.

* * * * *